United States Patent
Chen et al.

(10) Patent No.: US 11,332,379 B2
(45) Date of Patent: May 17, 2022

(54) INDUSTRIAL WASTE SALT RESOURCEFUL TREATMENT METHOD AND DEVICE

(71) Applicant: GO HIGHER ENVIRONMENT GROUP CO., LTD., Beijing (CN)

(72) Inventors: Futai Chen, Beijing (CN); Yongqian Chu, Beijing (CN); Yan Yang, Beijing (CN); Liqiang Bai, Beijing (CN)

(73) Assignee: GO HIGHER ENVIRONMENT GROUP CO., LTD., Beijing (CN)

(*) Notice: Subject to any disclaimer, the term of this patent is extended or adjusted under 35 U.S.C. 154(b) by 0 days.

(21) Appl. No.: 17/384,827

(22) Filed: Jul. 26, 2021

(65) Prior Publication Data
US 2021/0347649 A1 Nov. 11, 2021

Related U.S. Application Data

(63) Continuation of application No. PCT/CN2020/128127, filed on Nov. 11, 2020.

(30) Foreign Application Priority Data

Nov. 15, 2019 (CN) .......................... 201911122109.1
Nov. 15, 2019 (CN) .......................... 201911125591.4
(Continued)

(51) Int. Cl.
*B01D 1/26* (2006.01)
*B01D 9/00* (2006.01)
(Continued)

(52) U.S. Cl.
CPC .................. *C01D 3/16* (2013.01); *B01D 1/26* (2013.01); *B01D 9/0031* (2013.01);
(Continued)

(58) Field of Classification Search
CPC ... C01D 3/16; C01D 5/16; C01D 9/16; C01D 3/24; C02F 9/00; C02F 1/048; C02F 1/20;
(Continued)

(56) References Cited

U.S. PATENT DOCUMENTS 2,555,340 A * 6/1951 Hopper ................ B01D 9/0059
23/297
3,712,797 A * 1/1973 Winkler ................... B01D 1/26
23/296
(Continued)

FOREIGN PATENT DOCUMENTS

CN 104909494 A 9/2015
CN 105036222 A 11/2015
(Continued)

OTHER PUBLICATIONS

Jing Cao et al., Investigation of Solid-Liquid Equilibria on the Na+//Cl−, NO3−, SO42−—H2O System and the Na+//NO3−, SO42−—H2O System at 313.15 K, J. Chem. Eng. Data, Feb. 21, 2019, pp. 1209-1221, vol. 64.
(Continued)

*Primary Examiner* — Joseph W Drodge

(57) ABSTRACT

An industrial waste salt resourceful treatment method comprises the following steps: the industrial waste salt is sequentially subject to dissolving, chemical pre-purification, deep purification, organic matter concentration reduction, adsorption and oxidation decolorization and multi-effect evaporative crystallization to respectively obtain sodium sulfate, sodium chloride and sodium nitrate crystals; the crystallization temperature of sodium sulfate is in a range of 75° C. to 85° C.; the crystallization temperature of sodium chloride is in a range of 60 to 70° C.; and the crystallization temperature of sodium nitrate is in a range of 45° C. to 55°
(Continued)

C. An industrial waste salt resourceful treatment device is further provided.

13 Claims, 4 Drawing Sheets

(30) Foreign Application Priority Data

Dec. 2, 2019 (CN) .......................... 201911218752.4
Dec. 2, 2019 (CN) .......................... 201922129790.4

(51) Int. Cl.

| B01D 61/14 | (2006.01) |
| --- | --- |
| C01D 5/16 | (2006.01) |
| C01D 9/16 | (2006.01) |
| C02F 9/00 | (2006.01) |
| C02F 11/14 | (2019.01) |
| C02F 1/04 | (2006.01) |
| C02F 1/20 | (2006.01) |
| C02F 1/28 | (2006.01) |
| C02F 1/44 | (2006.01) |
| C02F 1/52 | (2006.01) |
| C02F 1/56 | (2006.01) |
| C02F 1/66 | (2006.01) |
| C01D 3/16 | (2006.01) |
| C02F 11/148 | (2019.01) |
| C02F 101/30 | (2006.01) |

(52) U.S. Cl.
CPC .............. *B01D 61/147* (2013.01); *C01D 5/16* (2013.01); *C01D 9/16* (2013.01); *C02F 9/00* (2013.01); *C01P 2006/80* (2013.01); *C02F 1/048* (2013.01); *C02F 1/20* (2013.01); *C02F 1/28* (2013.01); *C02F 1/444* (2013.01); *C02F 1/5236* (2013.01); *C02F 1/56* (2013.01); *C02F 1/66* (2013.01); *C02F 11/148* (2019.01); *C02F 2101/30* (2013.01)

(58) Field of Classification Search
CPC .......... C02F 1/28; C02F 1/444; C02F 1/5236; C02F 1/56; C02F 1/66; C02F 11/148; C02F 2101/30; C02F 1/02; C02F 1/04; C02F 1/043; C02F 1/26; C02F 1/42; C02F 1/44; C02F 1/441; C02F 1/442; C02F 1/447; C02F 1/469; C02F 1/4693; C02F 1/52; C02F 1/54; C02F 1/72; C02F 1/74; C02F 2001/5218; B01D 1/26; B01D 9/0018; B01D 9/0031; B01D 9/004; B01D 9/02; B01D 11/02; B01D 11/028; B01D 11/0288; B01D 15/00; B01D 19/00; B01D 19/0068; B01D 21/00; B01D 21/02; B01D 21/28; B01D 21/283; B01D 21/286; B01D 37/00; B01D 2009/0086; B01D 61/14; B01D 61/147; B01D 61/16; B01D 61/20; C01P 2006/80; E21B 21/06; E21B 21/063; E21B 21/065; E21B 21/068; B01J 45/00; B01J 47/00
USPC .... 210/177, 182, 202, 259, 321.6, 511, 638, 210/639, 650, 652, 702, 729, 742, 774, 210/663, 669, 806, 804, 644; 204/518, 204/535, 536, 551, 553, 571, 632, 635, 204/637, 648, 666; 166/308.1; 175/66, 175/206
See application file for complete search history.

(56) References Cited

U.S. PATENT DOCUMENTS

| 4,210,421 A * | 7/1980 | Dahms .................. B01D 1/26 |
| --- | --- | --- |
| | | 159/20.1 |
| 4,374,711 A * | 2/1983 | Ogawa ................... C25B 1/34 |
| | | 205/536 |
| 4,430,227 A * | 2/1984 | Hanson ................... C02F 1/26 |
| | | 210/642 |
| 5,468,394 A * | 11/1995 | Bader ..................... C02F 1/54 |
| | | 210/729 |
| 6,419,887 B1 * | 7/2002 | Cabello-Fuentes ..... C01C 1/185 |
| | | 423/199 |
| 7,501,065 B1 * | 3/2009 | Bader ................. B01D 61/027 |
| | | 210/652 |
| 9,527,753 B1 * | 12/2016 | Harrison ................ C01G 9/003 |
| 2004/0055955 A1 * | 3/2004 | Davis ..................... B01D 61/44 |
| | | 210/652 |
| 2007/0029259 A1 * | 2/2007 | Kakita ................. B01D 15/265 |
| | | 210/660 |
| 2012/0100051 A1 * | 4/2012 | Choi ........................ C02F 1/72 |
| | | 423/181 |
| 2014/0151296 A1 * | 6/2014 | Moore ..................... C02F 9/00 |
| | | 210/616 |
| 2015/0060368 A1 * | 3/2015 | Keister ................ C01F 11/462 |
| | | 210/710 |
| 2016/0289099 A1 * | 10/2016 | Wallace ................ C01B 7/0737 |
| 2017/0341949 A1 * | 11/2017 | Schuessler .............. C01D 7/40 |
| 2018/0148350 A1 * | 5/2018 | Gao ...................... B01J 21/04 |
| 2018/0162758 A1 * | 6/2018 | Cantrell ............... C02F 1/4691 |
| 2018/0230018 A1 * | 8/2018 | Kisielewski ............ C01D 7/40 |
| 2019/0202724 A1 * | 7/2019 | Zhang ..................... B01J 21/04 |
| 2020/0078796 A1 * | 3/2020 | Kochhar ................ B02C 23/36 |

FOREIGN PATENT DOCUMENTS

| CN | 105502438 A | 4/2016 |
| --- | --- | --- |
| CN | 105585194 A | 5/2016 |
| CN | 106082282 A | 11/2016 |
| CN | 106430253 A | 2/2017 |
| CN | 107096249 A | 8/2017 |
| CN | 109704369 A | 5/2019 |
| CN | 209502536 U | 10/2019 |
| CN | 110844922 A | 2/2020 |
| CN | 211688283 U | 10/2020 |

OTHER PUBLICATIONS

Wei-Yan Lin et al., Study on the Metastable Phase Equilibria of the Quaternary System Na+ //NO3−, Cl−, SO42−—H2O at 25° C. and 50° C., Journal of Chemical Engineering of Chinese Universities, Jun. 30, 2011, pp. 376-380, vol. 25, No. 3.
International Search Report of PCT Patent Application No. PCT/CN2020/128127 dated Feb. 10, 2021.

* cited by examiner

INDUSTRIAL WASTE SALT RESOURCEFUL TREATMENT METHOD AND DEVICE

CROSS-REFERENCE TO RELATED APPLICATION

The present application is a continuation application of PCT application serial No. PCT/CN2020/128127 filed on Nov. 11, 2020, which claims the priority and benefits of Chinese Patent Application No. 201911125591.4 filed on Nov. 15, 2019, Chinese Patent Application No. 201911122109.1 filed on Nov. 15, 2019, Chinese Patent Application No. 201911218752.4 filed on Dec. 2, 2019, and Chinese Patent Application No. 201922129790.4 filed on Dec. 2, 2019. The entirety of each of the above-mentioned patent applications is hereby incorporated by reference herein and made a part of this specification.

BACKGROUND

Technical Field

The present application relates to the field of the industrial waste salt treatment technology, and in particular, to an industrial waste salt resourceful treatment method and device.

Description of Related Art

The waste salt mainly refers to the by-product crystalline salt produced in industrial production, which is mainly divided according to its composition into single waste salt, mixed salt and miscellaneous salt containing impurities. The waste salt mainly comes from chemical production and wastewater treatment, including the waste salt produced in the process of pure water preparation, softening, and high-salt wastewater, and the waste salt produced in the process of by-product synthesis in the production of pesticides and chlor-alkali industries. Because the waste salt contains a lot of toxic and harmful substance, such as organic pollutants, heavy metal elements, etc., if unreasonably stacked, it is easy to cause pollution to soil, groundwater and air. In the face of increasingly strict environmental protection policies, the treatment of the waste salt, residue and distillation residue produced in the chemical industry has become an urgent problem to be solved.

At present, the most commonly used disposal methods for the waste salt are recycling and landfill treatment. The direct landfill of the waste salt is easier to absorb water than other general industrial wastes. If it is scattered and filled, the pile body is prone to settlement in the later stage, which brings safety hazards to subsequent landfill operations. The existing soluble hazardous wastes such as the waste salt are mostly directly landfilled after curing with cement. For flexible landfill plants, the waste salt has a good solubility and the possibility of leakage is larger, therefore there is a great risk, and thus there are great safety hazards to the environment in this area.

In terms of the recycling disposal of the waste salt, common methods currently used for the waste salt containing organic matter include dissolving and refining and then reconcentrating and crystallization treatment, direct thermal incineration, high-temperature carbonization, etc., however, these methods have a low removal rate for the organic matter in the waste salt. For the single waste salt, the solid salt will contain heavy metals, organic matter and other impurities; for the mixed salt, this solid salt contains not only organic matter and heavy metals, but also sodium chloride, sodium nitrate, sodium sulfate, which will limit the use of salt, and only a small amount can be used as a snow-melting agent or fabric coloring agent; and most of the remaining salt can only be landfilled or dumped, which not only easily pollutes the environment, but also causes a great waste of resources.

Therefore, in view of the above problems, researchers have improved the resourceful treatment of the waste salt. For example, Chinese Patent Document CN104909494A discloses an industrial high-concentration salt-water cleaning and purification process, which specifically includes the following steps: (1) performing a precipitation reaction treatment of industrial high-concentration salt-water, so as to remove $PO_4^{3-}$, $CO_3^{2-}$, SS, COD, fluorine, total silicon, and ions of calcium, iron, barium and strontium in the wastewater to obtain clarified effluent; (2) performing an ion exchange treatment of the clarified effluent obtained in step (1) to further remove metal ions of calcium, magnesium, barium and strontium in the wastewater so as to obtain the ion exchange effluent; (3) performing a degassing treatment on the ion exchange effluent obtained in step (2) to convert the carbonate and the bicarbonate in the wastewater into carbon dioxide and remove it by blowing off so as to obtain the degassed effluent; (4) decolorizing the degassed effluent obtained in step (3) to concentrate and separate the organic color-bearing substances so as to obtain the decolorized effluent; (5) performing oxidation of the decolorized effluent obtained in step (4) to remove the organic matter through oxidation, and performing multi-effect evaporative crystallization of the final produced water so as to produce the salt. Although this process reduces the environmental pollution, the waste of resources, and hazards such as scaling and corrosion inside the device during the multi-effect evaporative crystallization, the process finally only obtains the mixed salt, which is a mixture of sodium chloride, sodium nitrate and sodium sulfate that does not meet the industrial salt standard, resulting in a limited application, that is, the waste salt processed by recycling not being effectively utilized.

SUMMARY

Therefore, the technical problem to be solved by the present application is to overcome the defect in the prior art that the industrial waste salt cannot be effectively utilized after the resourceful treatment, so as to provide an industrial waste salt resourceful treatment method and device.

To this end, the present application provides the following technical solutions.

An industrial waste salt resourceful treatment method according to the present application embodiment comprises the following steps: the industrial waste salt is sequentially subject to dissolving, chemical pre-purification, deep purification, organic matter concentration reduction, adsorption and oxidation decolorization and multi-effect evaporative crystallization to respectively obtain sodium sulfate, sodium chloride and sodium nitrate crystals; wherein the crystallization temperature of sodium sulfate is in a range of 75° C. to 85° C.; the crystallization temperature of sodium chloride is in a range of 60 to 70° C.; and the crystallization temperature of sodium nitrate is in a range of 45° C. to 55° C.

In some embodiments, the multi-effect evaporative crystallization refers to that the salt solution after the adsorption and oxidation decolorization is sequentially subject to a first, a second, a three, and a four-effect evaporation to obtain a mother liquor that is subject to a triple crystallization to respectively obtain sodium sulfate, sodium chloride and sodium nitrate.

In some embodiments, the dissolving refers to that the industrial waste salt is subject to agitation and complete dissolving to remove an insoluble matter so as to obtain a primary clarified salt solution.

In some embodiments, the chemical pre-purification refers to that the primary clarified salt solution is subject to a precipitation treatment so as to obtain a secondary clarified salt solution.

In some embodiments, the number of the precipitation treatment is not less than 2 times.

In some embodiments, the deep purification refers to that the secondary clarified salt solution is sequentially subject to a microfiltration membrane, a resin adsorption and a degassing treatment so as to obtain a degassed salt solution.

In some embodiments, the resin adopts a chelating resin, and it is regularly regenerated.

In some embodiments, the degassing treatment refers to adjusting the pH of the salt solution after resin treatment, so that the volatile weak acid radical ions are converted into gas, which is then blown off and removed, to obtain the degassed salt solution.

In some embodiments, the organic matter concentration reduction refers to letting the degassed salt solution pass through a separation membrane to trap the organic matter, so as to obtain a purified salt solution and a concentrate liquid.

In some embodiments, the concentrate liquid is washed by the condensed water produced during the multi-effect evaporative crystallization, and the condensed water after washing is recycled to the dissolving step to dissolve the industrial salt.

In some embodiments, the adsorption and oxidation decolorization refers to that the purified salt solution is subject to the adsorption of a stacked filler, and then fully mixes and reacts with an oxidation agent to remove a chromophoric group of the organic matter and a part of the organic matter.

In some embodiments, the stacked filler is at least one of fiber balls, activated carbon and polypropylene (PP) soft filler; and/or the oxidation agent is at least one of ozone, Fenton's reagent and hydrogen peroxide.

A device for the industrial waste salt resourceful treatment method according to another aspect of the present application embodiment comprises sequentially connected a dissolution tank, a chemical pre-purification system, a deep purification system, an organic matter concentration reduction system, an adsorption and oxidation system and an evaporative crystallization system, wherein the chemical pre-purification system comprises a primary reactor, a primary clarifier, a secondary reactor, a secondary clarifier and a supporting dosing means; the deep purification system comprises a microfiltration means, a resin adsorption means and a degassing means; the organic matter concentration reduction system is a membrane separation means; the adsorption and oxidation system comprises a filler adsorption means and an oxidation means; the evaporative crystallization system is a multi-effect evaporative crystallization means.

The technical solution of the present application has the following advantages.

1. The industrial waste salt resourceful treatment method provided by the present application comprises the following steps: the industrial waste salt is sequentially subject to dissolving, chemical pre-purification, deep purification, organic matter concentration reduction, adsorption and oxidation decolorization and multi-effect evaporative crystallization to respectively obtain sodium sulfate, sodium chloride and sodium nitrate crystals; wherein the crystallization temperature of sodium sulfate is in the range of 75° C. to 85° C.; the crystallization temperature of sodium chloride is in the range of 60 to 70° C.; and the crystallization temperature of sodium nitrate is in the range of 45° C. to 55° C. By using the above steps, the organic matter and other impurities in the industrial waste salt are firstly removed, and then salt crystallization is achieved through the temperature control of the evaporation process, that is, the difference in the three-phase common saturation points of sodium chloride, sodium nitrate and sodium sulfate at different temperatures and in the dissolving degree of each salt is used to perform the salt crystallization. Moreover, the purity and whiteness of sodium chloride, sodium nitrate and sodium sulfate obtained by the salt crystallization each have reached the industrial-grade standard, which can be directly applied, making the industrial salt treated by the resourceful treatment method of the industrial waste salt provided by the present application can be effectively utilized.

2. The industrial waste salt resourceful treatment method provided by the present application, through the use of a two-stage pre-purification manner, that is, a treatment technology of the chemical purification combined with the microfiltration membrane and the resin adsorption, effectively reduces the difficulty and cost of pretreatment of the industrial waste salt, while purifying heavy metals and impurities in the industrial waste salt.

3. The industrial waste salt resourceful treatment method provided by the present application, through the use of a separation membrane to trap, can remove most of the organic matter in the industrial waste salt, and ensure the quality of the final product; and the filler added in the subsequent adsorption and oxidation decolorization can not only adsorb the organic matter with chromophoric groups and thus function as partially decolorizing, but also adsorb phosphorus, ammonia, nitrogen and like in the solution, further ensuring the quality of the final product.

4. The industrial waste salt resourceful treatment method provided by the present application, by washing the concentrate liquid generated after the organic matter concentration reduction by the condensed water generated during multi-effect evaporative crystallization, can recover the salt in the concentrate liquid to avoid the problem of coking, slagging and like in an incinerator during the incineration of the salt-containing concentrated liquid, which will cause the incineration to not be carried out normally. Moreover, the condensate water after washing is recycled to the dissolving step to dissolve the industrial salt, which realizes the multi-stage recycling use of condensate water and avoids the waste of resources and the secondary pollution.

5. The device suitable for the industrial waste salt resourceful treatment method provided by the present application comprises sequentially connected a dissolution tank, a chemical pre-purification system, a deep purification system, an organic matter concentration reduction system, an adsorption and oxidation system and an evaporative crystallization system. By using the above device, the organic matter and other impurities in the industrial waste salt are firstly removed, and then salt crystallization is achieved through the temperature control of the evaporation process, that is, the difference in the three-phase common saturation points of sodium chloride, sodium nitrate and sodium sulfate at different temperatures and in the dissolving degree of each salt is used to perform the salt crystallization. Moreover, the purity and whiteness of sodium chloride, sodium nitrate and sodium sulfate obtained by the salt crystallization each have reached the industrial-grade standard, which can be directly applied, making the industrial salt treated by the resourceful treatment method of the industrial waste salt provided by the present application can be effectively utilized.

BRIEF DESCRIPTION OF THE DRAWINGS

In order to more clearly illustrate the specific implementation of the present application or the technical solution in the prior art, the following will briefly introduce the drawings that need to be used in the specific implementation or the description of the prior art. Obviously, the following description of the drawings are some implementations of the present application. For those of ordinary skill in the art, other drawings can be obtained based on these drawings without creative work.

DESCRIPTION OF THE EMBODIMENTS

The following examples are provided for a better understanding of the present application, and are not limited to the best implementation mode, and do not limit the content and protection scope of the present application. Any product that is the same or similar to the present application, made by anyone inspired by the present application or by combining the features of the present application with other existing technologies, falls within the scope of protection of the present application.

Those without marked specific experimental steps or conditions in the examples can be carried out according to the operations or conditions of the conventional experimental steps described in the literature in the field. The reagents or instruments used without the manufacturer's instructions can be conventional reagent products purchased from the market.

In order to illustrate the advantages of the industrial waste salt resourceful treatment method in the present application, the following specific industrial waste salt resourceful treatment method is provided. Of course, if the content of individual components of the industrial waste salt treated by the industrial waste salt resourceful treatment method in the present application have changed, and the crystallization order of sodium chloride, sodium nitrate and sodium sulfate has changed, the technical effect equivalent to that of the following industrial waste salt resourceful treatment method can also be obtained.

Figure 1:
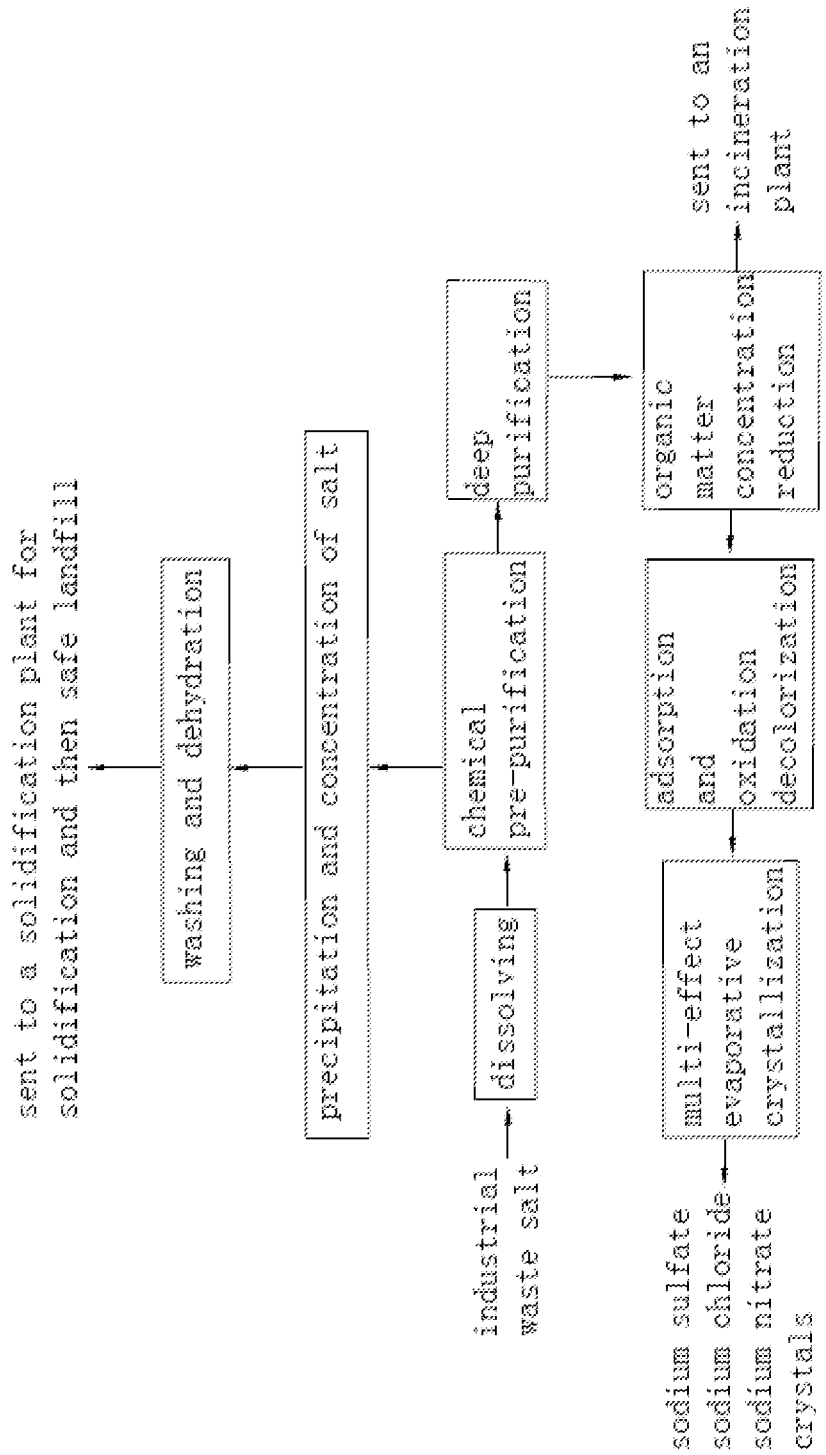
FIG. 1 is a process flow diagram of an industrial waste salt resourceful treatment method in the present application.
Figure 4:
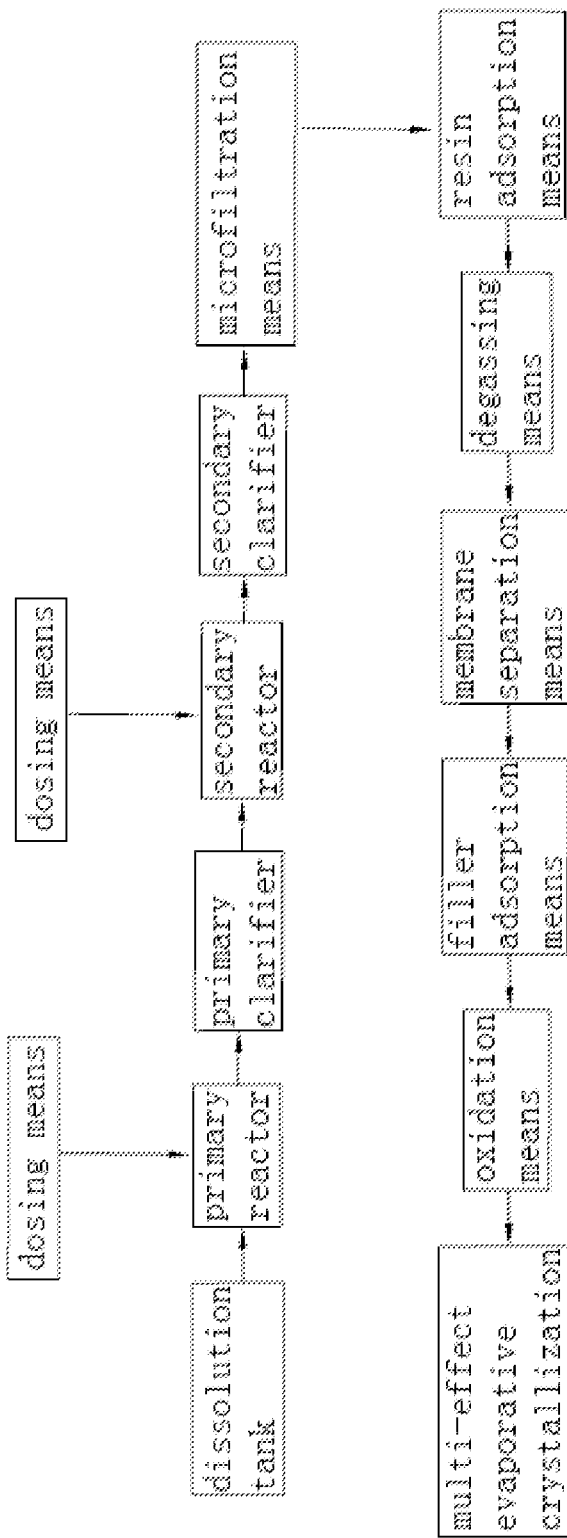
FIG. 4 is a flow chart of a device suitable for the industrial waste salt resourceful treatment method in the present application.

FIG. 1 shows a specific industrial waste salt resourceful treatment method provided by the present application that adopts a device for the industrial waste salt resourceful treatment method as shown in FIG. 4. The industrial waste salt resourceful treatment method of the present application specifically includes the following steps.

Detection of Content of Sodium Chloride, Sodium Nitrate and Sodium Sulfate in the Industrial Waste Salt An ECO-883 type ion chromatography is used to detect chloride, nitrate and sulfate ions in the industrial waste salt, so as to determine the content of sodium chloride, sodium nitrate and sodium sulfate in the industrial waste salt as a reference for the crystallization order of each salt during a subsequent multi-effect evaporative crystallization. The content of the three types of salts in this example from high to low sequentially is sodium sulfate, sodium chloride, and sodium nitrate.

Dissolving

After the above-mentioned industrial waste salt is stirred and fully dissolved in a dissolving pool, it is filtered to obtain a primary clarified salt solution, and the insoluble matter is sent to an incineration plant for harmless disposal.

Chemical Pre-Purification

The primary clarified salt solution enters a primary reaction system, and lime as a precipitant is added to the primary reaction system to form insoluble precipitate with heavy metal ion, fluoride ion, sulfide, carbonate, phosphate and like in the water, while adsorbing organic matter and toxic substance, and then polyaluminum chloride PAC as a coagulant and polyacrylamide PAM as a coagulant aid are added. The solution then enters a primary clarification tank for sludge-water separation, so that the above-mentioned substances form sludge and are separated from the water, the produced water enters a subsequent section, and the sludge is dehydrated and sent to a solidification plant for disposal and then to a safe landfill plant.

The clarified water from the primary reaction enters a secondary clarification system, and sodium carbonate as a precipitant is added to a secondary reaction system to form insoluble precipitates with metal cations in the aqueous solution, while adsorbing organic matter and toxic substances, and then polyaluminum chloride PAC as a coagulant, and polyacrylamide PAM as a coagulant aid are added. The solution then enters the secondary clarification tank for sludge-water separation, a secondary clarified salt solution obtained enters a subsequent section, and the sludge is dehydrated and sent to the solidification plant for disposal and then to the safe landfill plant.

Deep Purification

The secondary clarified salt solution enters a microfiltration membrane with a pore size of 0.5 μm. After passing through the microfiltration membrane to trap SS and colloidal substances, it passes through a chelating resin such that metal cations in the salt-water are absorbed, and the produced water enters a subsequent section, and the chelating resin is regularly regenerated.

The effluent of the chelating resin is adjusted to pH 3.5 to make carbonate and other volatile weak acid radicals in the salt water exist in gaseous form, and then the salt water undergoes the degassing: the salt water is sprayed to flow through a stacked filler of activated carbon with a large specific surface area, and the air enters from a lower air inlet and passes through the filler layer in the reverse direction; the oxidation carbon in the salt-water is rapidly precipitated, and is discharged from the top, and after the oxidation carbon in the wastewater is removed, it enters a subsequent section.

Organic Matter Concentration Reduction (Purification System)

Figure 2:
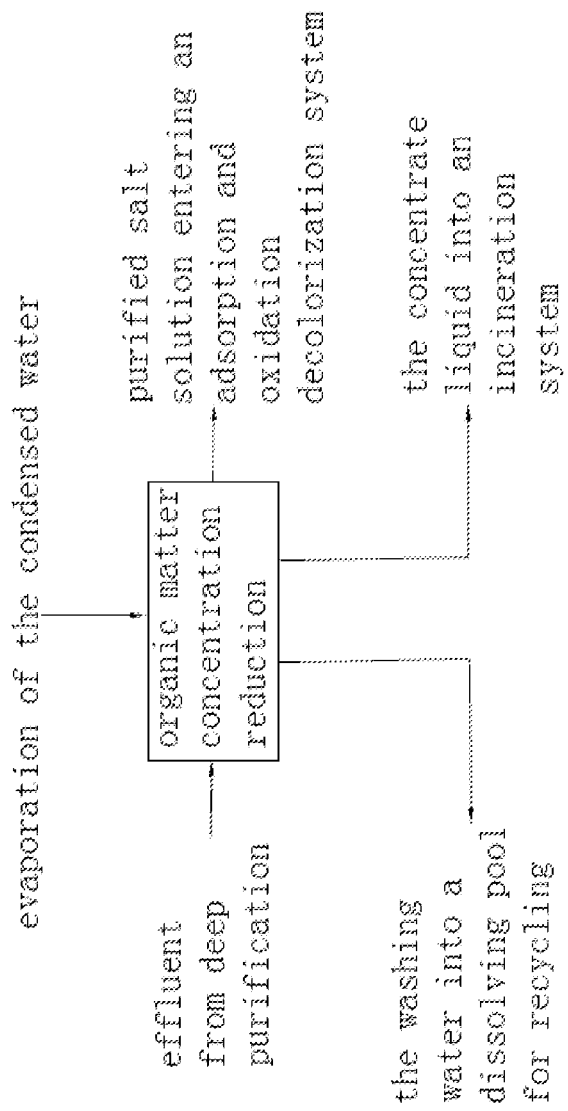
FIG. 2 is a flowchart of an organic matter concentration reduction step in the present application.

As shown in FIG. 2, The effluent from deep purification enters an organic matter concentration reduction step in which a GH nano-modified membrane is used. By using the performance of such a separation membrane that only traps macromolecular organic matter and part of small molecular organic matter and almost does not trap salt, the organic matter in the concentrated water trapped by the nano-modified membrane is increased while the amount of the concentrate liquid is reduced. The purified salt solution enters an adsorption and oxidation decolorization pretreatment stage: the condensed water generated during the multi-effect evaporative crystallization is used to wash and concentrate the concentrate liquid, and finally the concentrate liquid enters the incineration unit, and the washing water is recycled to the dissolving pool to dissolve the industrial salt.

Adsorption and Oxidation Decolorization

Figure 3:
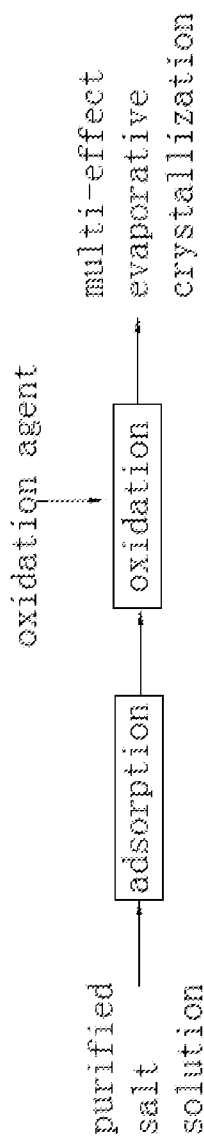
FIG. 3 is a flowchart of an adsorption and oxidation decolorization step in the present application.

As shown in FIG. 3, the purified salt solution enters an adsorption and oxidation decolorization step. By using the adsorption performance of the stacked filler fiber ball with a large specific surface area, the organic matter in the purified salt solution is adsorbed and removed, and then ozone as a strong oxidation agent is added and mixed well with the purified salt solution. By using the strong oxidation property of the oxidation agent of ozone to open chromophoric groups of the organic matter while removing the organic matter, the content of the organic matter in the purified salt solution is further reduced, and then a multi-effect evaporative crystallization is carried out.

Multi-Effect Evaporative Crystallization

The salt solution after the adsorption and oxidation decolorization is preheated first, and then sequentially enters a first-effect evaporator with a temperature in the range of 110 to 120° C., a second-effect evaporator with a temperature in the range of 100 to 110° C., a three-effect evaporator with a temperature in the range of 85 to 95° C. and a four-effect evaporator with a temperature in the range of 75 to 85° C. The multi-effect evaporation can make reasonable use of temperature difference and save the energy loss during the multi-effect evaporative crystallization.

Sodium sulfate crystallizes out in the four-effect evaporator, and is subject to separation, then thickening, centrifugal drying and packaging to obtain a sodium sulfate product with the purity more than 92% and the whiteness also reaching the industrial standard, which is packaged by a packaging machine and then sold as industrial sodium sulfate.

The mother liquor in the four-effect evaporator is transferred to a first crystallization tank in which the temperature is controlled over a range of 60 to 70° C., so that sodium chloride crystallizes out, and then is subject to thickening, centrifugal drying and packaging to obtain sodium chloride product with the purity more than 92% and the whiteness also reaching the industrial standard, which is packaged by a packaging machine and then sold as industrial sodium chloride.

The remaining mother liquor is transferred to a second crystallization tank in which the temperature is controlled over a range of 45 to 55° C., so that sodium nitrate crystallizes out, and then is subject to thickening, centrifugal drying and packaging to obtain sodium nitrate product with the purity more than 90% and the whiteness also reaching the industrial standard, which is packaged by a packaging machine and then sold as industrial sodium nitrate.

It can be seen from the above-mentioned embodiments that in the industrial waste salt resourceful treatment method provided by the present application, salt crystallization is achieved through the temperature control of the evaporation process, that is, the difference in the three-phase common saturation points of sodium chloride, sodium nitrate and sodium sulfate at different temperatures and in the dissolving degree of each salt is used to perform the salt crystallization. Moreover, the purity and whiteness of sodium chloride, sodium nitrate and sodium sulfate obtained by the salt crystallization each have reached the industrial-grade standard, which can be directly applied, making the industrial salt treated by the resourceful treatment method of the industrial waste salt provided by the present application can be effectively utilized.

As shown in FIG. 4, an industrial waste salt resourceful treatment device provided by the present application comprises sequentially connected a dissolution tank, a chemical purification system, a deep purification system, an organic matter concentration reduction system, an adsorption and oxidation system and an evaporative crystallization system.

Among them, the dissolution tank is a waste salt dissolving device. The chemical purification system comprises a primary reactor, a primary clarifier, a secondary reactor, a secondary clarifier and a supporting dosing means, and through the chemical purification system, heavy metals and impurities such as suspended solids, etc. are initially removed from the salt solution. The deep purification system comprises a microfiltration means, a resin adsorption means and a degassing means, and through the deep purification system, impurities and the oxidation carbon, etc. are further removed from the salt solution from the previous system. The organic matter concentration reduction system is a membrane separation means, and the organic membrane separator is used to remove most of the organic matter. The adsorption and oxidation system comprises a filler adsorption means and an oxidation means, wherein the adsorption means is an adsorption filler with a large specific surface area, which can adsorb the residual organic matter, and the oxidation means decomposes the residual organic matter by adding an oxidation agent. The evaporative crystallization system is a multi-effect evaporative crystallization means.

In some embodiments, the multi-effect evaporative crystallization means is a four-effect evaporative crystallization means. The salt solution from the previous treatment system is sequentially subject to a first, a second, a three, and a four-effect evaporation to obtain a mother liquor that is subject to a triple crystallization to respectively obtain sodium sulfate, sodium chloride and sodium nitrate.

Obviously, the above-mentioned embodiments are only examples made for a clear description, and are not intended to limit the implementation. For those of ordinary skill in the art, other changes or modifications in different forms can also be made on the basis of the above description. There is no need and cannot provide an exhaustive list of all implementation methods. The obvious changes or modifications derived from these are still within the scope of protection created by the present application.

What is claimed is:

1. An industrial waste salt resourceful treatment method, comprising the following steps:
the industrial waste salt being sequentially subjected to steps comprising dissolving, chemical pre-purification, deep purification, organic matter concentration reduction, adsorption and oxidation decolorization and multi-effect evaporative crystallization to respectively obtain sodium sulfate, sodium chloride and sodium nitrate crystals;
wherein sodium sulfate is crystallized in a temperature range of 75° C. to 85° C.; sodium chloride is crystallized in a temperature range of 60 to 70° C.; and sodium nitrate is crystallized in a temperature range of 45° C. to 55° C.,
wherein the multi-effect evaporative crystallization comprises the salt solution after the adsorption and oxidation decolorization being sequentially subjected to a first-effect evaporation, a second-effect evaporation, a three-effect evaporation, and a four-effect evaporation to obtain a mother liquor that is subjected to three crystallization steps to respectively obtain sodium sulfate, sodium chloride and sodium nitrate, wherein a temperature of the first-effect evaporation is in a range of 110-120° C., a temperature of the second-effect evaporation is in a range of 100-110° C., a temperature of the third-effect evaporation is in a range of 85-95° C., and a temperature of the fourth-effect evaporation is in a range of 75-85° C.

2. The industrial waste salt resourceful treatment method according to claim 1, wherein the dissolving comprises the industrial waste salt being subjected to agitation and complete dissolving to remove an insoluble matter so as to obtain a primary clarified salt solution.

3. The industrial waste salt resourceful treatment method according to claim 2, wherein the chemical pre-purification comprises the primary clarified salt solution being subjected to a precipitation treatment so as to obtain a secondary clarified salt solution.

4. The industrial waste salt resourceful treatment method according to claim 3, wherein precipitation treatment is conducted not less than 2 times.

5. The industrial waste salt resourceful treatment method according to claim 1, wherein the deep purification comprises the secondary clarified salt solution being sequentially subjected to a microfiltration membrane treatment, a resin adsorption and a degassing treatment so as to obtain a degassed salt solution.

6. The industrial waste salt resourceful treatment method according to claim 5, wherein the resin comprises a chelating resin, and it is periodically regenerated.

7. The industrial waste salt resourceful treatment method according to claim 5, wherein the degassing treatment comprises adjusting the pH of the salt solution after the resin adsorption, so that the volatile weak acid radical ions are converted into gas, which is then blown off and removed, to obtain the degassed salt solution.

8. The industrial waste salt resourceful treatment method according to claim 1, wherein the organic matter concentration reduction comprises letting the degassed salt solution pass through a separation membrane to trap the organic matter, so as to obtain a purified salt solution and a concentrate liquid.

9. The industrial waste salt resourceful treatment method according to claim 8, wherein the concentrate liquid is washed by condensed water produced during the multi-effect evaporative crystallization, and the condensed water after washing is recycled to the dissolving step to dissolve the industrial salt.

10. The industrial waste salt resourceful treatment method according to claim 1, wherein the adsorption and oxidation decolorization comprises the purified salt solution being subjected to the adsorption of a stacked filler, and then being fully mixed and reacted with an oxidation agent to remove chromophoric groups of the organic matter so as to reduce content of the organic matter.

11. The industrial waste salt resourceful treatment method according to claim 10, wherein the stacked filler is at least one of fiber balls, activated carbon and polypropylene soft filler.

12. The industrial waste salt resourceful treatment method according to claim 10, wherein the oxidation agent is at least one of ozone, Fenton's reagent and hydrogen peroxide.

13. A device suitable for the industrial waste salt resourceful treatment method according to claim 1, comprising sequentially connected units of a dissolution tank, a chemical pre-purification system, a deep purification system, an organic matter concentration reduction system, an adsorption and oxidation system and an evaporative crystallization system;

the chemical pre-purification system comprising a primary reactor, a primary clarifier, a secondary reactor, a secondary clarifier and dosing means for the respective reactors;

the deep purification system comprising a microfiltration means, a resin adsorption means and a degassing device;

the organic matter concentration reduction system comprising a membrane separation device;

the adsorption and oxidation system comprising a filler adsorption means and an oxidation device; and the evaporative crystallization system comprising a multi-effect evaporative crystallization device.

* * * * *